US007206171B2

(12) United States Patent
Okawara (10) Patent No.: US 7,206,171 B2
(45) Date of Patent: Apr. 17, 2007

(54) METHOD FOR CORRECTING A STATIC POSTURE OF A HEAD PORTION AND A STATIC POSTURE CORRECTING APPARATUS

(75) Inventor: Osamu Okawara, Aikoh-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 11/512,589

(22) Filed: Aug. 30, 2006

(65) Prior Publication Data

US 2007/0047148 A1  Mar. 1, 2007

(30) Foreign Application Priority Data

Aug. 31, 2005 (JP) ............... 2002-251401

(51) Int. Cl.
*G11B 5/56* (2006.01)
(52) U.S. Cl. .................................. 360/245.5
(58) Field of Classification Search ............ None
See application file for complete search history.

(56) References Cited

FOREIGN PATENT DOCUMENTS

JP    2002-074630    3/2002

*Primary Examiner*—Hoa T. Nguyen
*Assistant Examiner*—Mark Blouin
(74) *Attorney, Agent, or Firm*—Jordan and Hamburg LLP (57) ABSTRACT

A static posture correcting apparatus has a controller preparing a correction recipe-table, a measuring unit measuring a pitch angle and a roll angle of a head portion of a flexure of a head suspension, a laser irradiating unit irradiating laser beams on irradiation lines of a flexure of an objective head suspension, the controller selecting an effectual correction recipe from the correction recipe-table and controlling the laser irradiating section to irradiate laser beams on the irradiation lines of the flexure of the objective head suspension according to the selected correction recipe, wherein the controller considers variations among reference values of pitch angle and roll angle changes of the sample head suspensions when preparing the correction recipe-table and selects the recipe so as to diminish an expected variation in target static posture angle characteristic due to correction.

6 Claims, 7 Drawing Sheets

Fig. 4A Correction Effects of Pitch Fraction (Unit: deg)

| Line Number | #1 | #2 | #3 | #4 | #5 | #6 | Average | σ |
|---|---|---|---|---|---|---|---|---|
| F1 | 0.538 | 0.256 | 0.331 | 0.218 | 0.570 | 0.328 | 0.374 | 0.147 |
| F2 | 0.430 | 0.258 | 0.255 | 0.345 | 0.476 | 0.388 | 0.359 | 0.090 |
| F3 | 0.297 | 0.332 | 0.304 | 0.257 | 0.261 | 0.332 | 0.297 | 0.033 |
| F4 | 0.257 | 0.172 | 0.206 | 0.150 | 0.199 | 0.188 | 0.195 | 0.036 |
| F5 | 0.206 | 0.210 | 0.189 | 0.183 | 0.245 | 0.187 | 0.203 | 0.023 |
| F6 | 0.190 | 0.190 | 0.234 | 0.189 | 0.219 | 0.208 | 0.205 | 0.019 |
| F7 | 0.102 | 0.080 | 0.085 | 0.067 | 0.089 | 0.108 | 0.089 | 0.015 |
| F8 | 0.091 | 0.089 | 0.120 | 0.080 | 0.085 | 0.098 | 0.094 | 0.014 |
| F9 | 0.012 | 0.015 | 0.007 | 0.033 | 0.026 | 0.019 | 0.019 | 0.010 |
| F10 | 0.028 | 0.015 | 0.025 | 0.062 | 0.016 | 0.007 | 0.026 | 0.019 |
| F11 | 0.002 | 0.016 | -0.013 | 0.029 | 0.013 | 0.018 | 0.011 | 0.015 |
| F12 | 0.005 | 0.017 | 0.023 | -0.014 | 0.010 | 0.006 | 0.008 | 0.013 |
| F13 | 0.005 | 0.008 | 0.009 | 0.014 | 0.029 | 0.034 | 0.017 | 0.012 |
| F14 | -0.025 | -0.014 | -0.019 | -0.015 | -0.008 | -0.015 | -0.016 | 0.006 |
| F15 | -0.020 | -0.010 | -0.032 | -0.036 | -0.023 | -0.008 | -0.022 | 0.011 |
| F16 | -0.006 | -0.012 | 0.016 | 0.004 | -0.008 | -0.019 | -0.004 | 0.012 |
| F17 | -0.033 | -0.029 | -0.029 | -0.026 | -0.036 | -0.030 | -0.031 | 0.004 |
| F18 | -0.019 | -0.012 | -0.019 | -0.037 | -0.003 | -0.021 | -0.019 | 0.011 |

Fig. 4B Correction Effects of Roll Fraction (Unit: deg)

| Line Number | #1 | #2 | #3 | #4 | #5 | #6 | Average | σ |
|---|---|---|---|---|---|---|---|---|
| F1 | -0.423 | -0.112 | -0.423 | -0.018 | -0.026 | -0.102 | -0.184 | 0.189 |
| F2 | 0.269 | 0.196 | 0.182 | 0.189 | 0.259 | 0.190 | 0.214 | 0.039 |
| F3 | -0.188 | -0.068 | -0.198 | -0.212 | -0.172 | -0.223 | -0.177 | 0.056 |
| F4 | 0.035 | -0.102 | 0.000 | 0.054 | 0.019 | -0.026 | -0.003 | 0.056 |
| F5 | -0.018 | -0.015 | -0.012 | 0.016 | -0.037 | -0.043 | -0.018 | 0.021 |
| F6 | -0.004 | -0.035 | -0.024 | 0.039 | -0.025 | -0.032 | -0.014 | 0.028 |
| F7 | 0.106 | 0.099 | 0.100 | 0.072 | 0.093 | 0.096 | 0.094 | 0.012 |
| F8 | -0.096 | -0.087 | -0.084 | -0.096 | -0.093 | -0.090 | -0.091 | 0.005 |
| F9 | 0.139 | 0.137 | 0.125 | 0.131 | 0.120 | 0.125 | 0.130 | 0.007 |
| F10 | -0.138 | -0.111 | -0.143 | -0.073 | -0.157 | -0.131 | -0.126 | 0.030 |
| F11 | 0.147 | 0.152 | 0.153 | 0.165 | 0.142 | 0.135 | 0.149 | 0.010 |
| F12 | -0.123 | -0.133 | -0.113 | -0.145 | -0.124 | -0.126 | -0.127 | 0.011 |
| F13 | 0.125 | 0.192 | 0.155 | 0.156 | 0.219 | 0.225 | 0.179 | 0.040 |
| F14 | -0.173 | -0.163 | -0.137 | -0.162 | -0.155 | -0.142 | -0.155 | 0.014 |
| F15 | 0.125 | 0.119 | 0.103 | 0.100 | 0.120 | 0.117 | 0.114 | 0.010 |
| F16 | -0.102 | -0.111 | -0.115 | -0.092 | -0.112 | -0.105 | -0.106 | 0.008 |
| F17 | 0.148 | 0.148 | 0.121 | 0.151 | 0.151 | 0.144 | 0.144 | 0.011 |
| F18 | -0.132 | -0.125 | -0.098 | -0.125 | -0.123 | -0.119 | -0.120 | 0.012 |

METHOD FOR CORRECTING A STATIC POSTURE OF A HEAD PORTION AND A STATIC POSTURE CORRECTING APPARATUS

BACKGROUND OF THE INVENTION

1. Field of the Invention

The present invention relates to method for correcting a static posture of a head portion and a static posture correcting apparatus for a head suspension and the like for a hard disk drive incorporated in an information processing apparatus such as computer.

2. Description of the Related Art

Recently the tolerance of a pitch angle and a roll angle as a static posture angle of a head portion of a head suspension is diminished. A pitch and roll correcting process for correcting a pitch angle and a roll angle of the head portion has become important. The head portion constitutes a flexure to be attached to a head suspension, for supporting a slider to write and read data to and from a disk arranged in a hard disk drive.

In a pitch and roll correcting process according to a related art, for example, a pitch angle and a roll angle of a head portion of a flexure of a head suspension without a slider or a head gimbal assembly with a slider are measured previously. Then irradiation lines are selected to correct the head portion so as to obtain a target pitch angle and a target roll angle thereof, and laser beams are irradiated on the selected irradiation lines in turn. In the specification, the head suspension and the head gimbal assembly are hereinafter referred to as "head suspension."

The selection of the irradiation lines is, for example, made as follows. Namely, it measures the amount of change of data from a plurality of sample head suspensions which show where and how a flexure is irradiated and how much the angles change at a head portion. It is hereinafter referred to as "calibration." Based on the results of this calibration, a correction recipe-table covering all the combinations of irradiation lines which shows where to irradiate laser beam to correct a head portion so as to obtain target angles thereof is prepared.

Then a combination of irradiation lines as a correction recipe is selected from the correction recipe-table so as to correct a pitch angle and a roll angle measured from a head portion of a flexure of an objective head suspension before correction into a target pitch angle and a target roll angle with the minimum number of laser irradiation.

The laser irradiation is done on each selected irradiation line of the flexure of the objective head suspension according to the selected correction recipe, so that the pitch angle and the roll angle of the head portion of the flexure of the objective head suspension are corrected.

However, in the correction method with the minimum number of laser irradiation according to the related art, the variations among the sample head suspensions of calibration results are not considered. This generates great variation in a pitch angle and a roll angle due to correction, to deteriorate the correction accuracy.

The related art mentioned above is disclosed in Japanese Unexamined Patent Application Publication No. 2002-74630.

SUMMARY OF THE INVENTION

An object of the present invention is to solve the problem to generate variation in a static posture angle of each product due to correction to deteriorate correction accuracy.

In order to accomplish the object, an aspect of the present invention is most characterized by preparing a correction recipe-table in view of variations among reference values of static posture angle changes of sample head suspensions in calibration, and selecting a correction recipe such that an expected variation in a static posture angle of a head portion of a flexure of an objective head suspension due to correction is diminished to obtain target static posture angle characteristic.

According to this aspect of the present invention, the method for correcting a static posture and a static posture correcting apparatus can prepare the correction recipe-table in view of variations among reference values of static posture angle changes of sample head suspensions in calibration. A correction recipe is selected such that an expected variation in a static posture angle of a head portion of a flexure of an objective head suspension due to correction is diminished to obtain target static posture angle characteristic. Therefore, it can diminish the variation in the static posture angle after correction and can conduct correction of the static posture angle with high accuracy.

DETAILED DESCRIPTION OF EMBODIMENTS

Static posture correcting apparatuses and methods for correcting a static posture of a head portion according to embodiments of the present invention will be explained in detail. Each embodiment has a novelty in considering variations among reference values of static posture angle changes of sample head suspensions in calibration, to solve the problem to generate variation in a static posture angle of each product due to correction.

Figure 1:
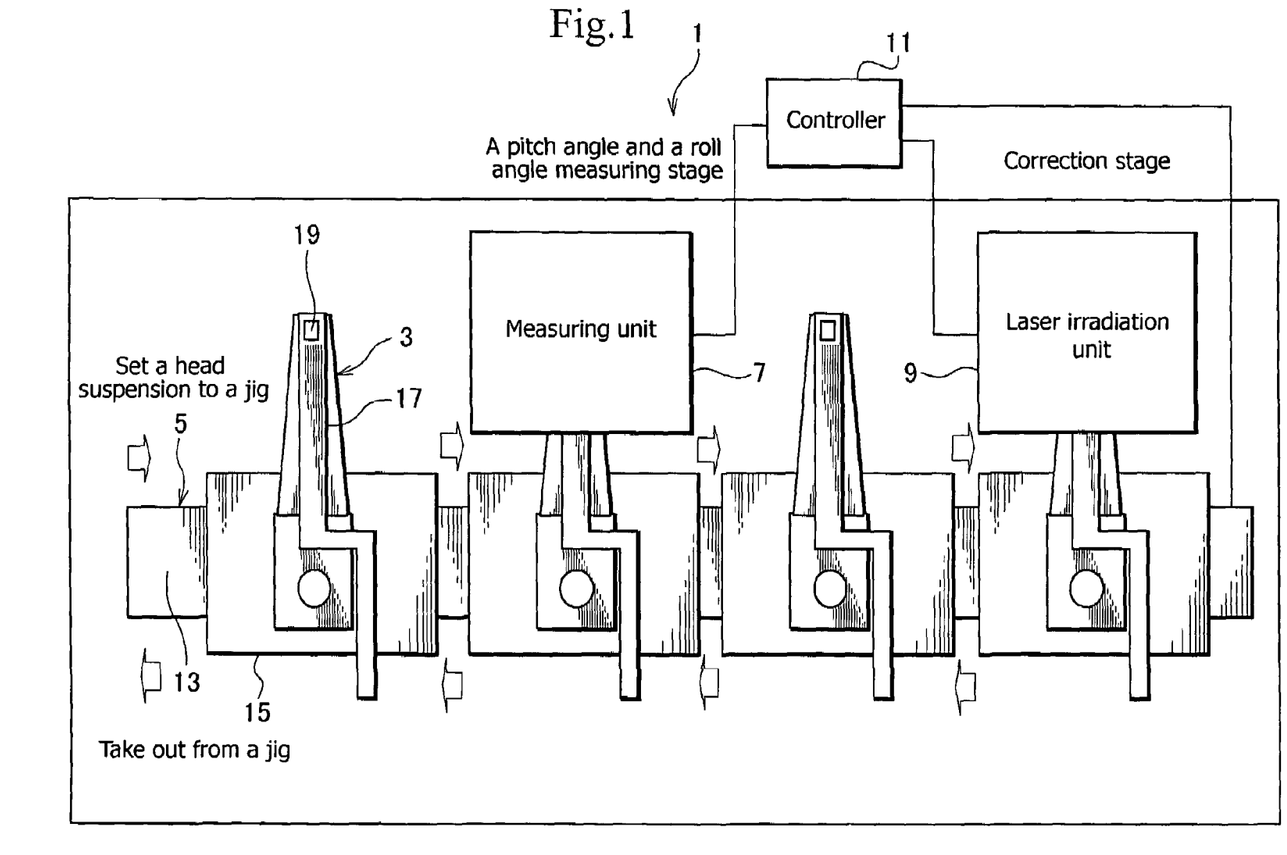
FIG. 1 is a schematic diagram showing a static posture correcting apparatus according to a first embodiment of the present invention.
Figure 2:
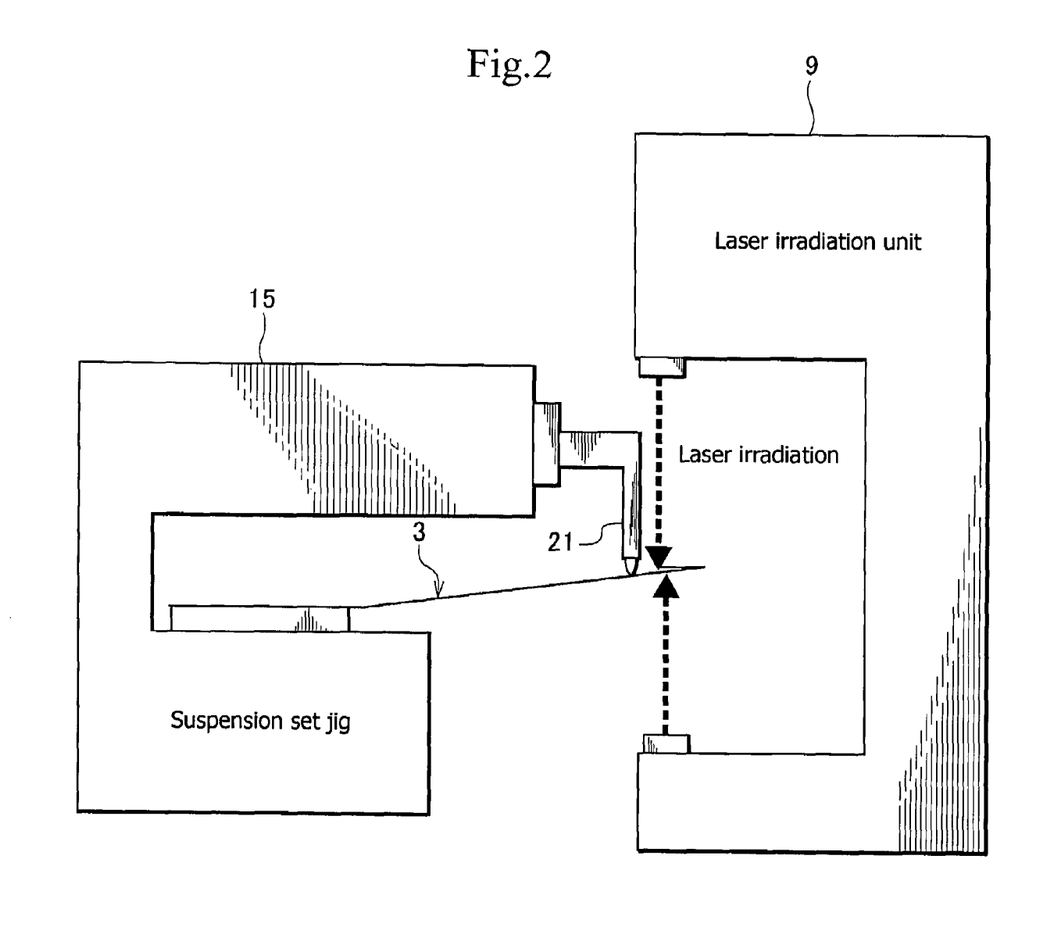
FIG. 2 is a schematic side view showing a laser irradiation unit of the static posture correcting apparatus of FIG. 1.

A static posture correcting apparatus according to the first embodiment of the present invention will be explained with reference to FIGS. 1 and 2 in which FIG. 1 is a schematic diagram showing a static posture correcting apparatus and FIG. 2 is a schematic side view showing a laser irradiation unit of the static posture correcting apparatus of FIG. 1.

As shown in FIG. 1, a static posture correcting apparatus 1 includes a carrier unit 5 for a head suspension 3, a measuring unit 7 serving as a static posture angle measuring section, a laser irradiation unit 9 serving as a laser irradiation section and a controller 11. The measuring unit 7 and the laser irradiation unit 9 are arranged with respect to the carrier 5.

In this specification, the head suspension includes at least a base plate and a load beam supporting a flexure 17. The flexure 17 has a head portion 19 for supporting a slider that faces a disk to write and read data to and from the disk. The "disk" is a storage medium which is arranged in a hard disk drive and to and from which data is written and read through the head suspension.

The carrier unit 5 has a carrier line 13 and a plurality of suspension set jigs 15 which support a head suspension 3 and travel on the carrier line 13 respectively. The carrier unit 5 carries back and forth the suspension set jigs 15 each supporting a head suspension 3.

The measuring unit 7 measures a pitch angle and a roll angle as a static posture angle of a head portion 19 of a flexure 17 of a head suspension 3. The measurement results as measurement value of the measured pitch angle and roll angle are input into the controller 11 from the measuring unit 7.

The laser irradiation unit 9 irradiates laser beams on irradiation lines as after-mentioned required portions to be corrected of a flexure 17 of an objective head suspension, to correct a pitch angle and a roll angle of a head portion 19 of the flexure 17. In the specification, an "objective flexure" is used as a flexure of an objective head suspension.

The controller 11 forms a correction recipe-table preparing section. The controller 11 previously prepares a correction recipe-table and stores the prepared correction recipe-table into a storing part (not shown) thereof. The correction recipe-table is prepared on the basis of reference value of a pitch angle change and a roll angle change of a head portion 19 of a flexure 17 obtained from a plurality of sample head suspensions. The reference value is appeared by irradiating laser beams on a plurality of irradiation lines of the flexure 17 of each sample head suspension. When preparing the correction recipe-table, variations among the reference values of the pitch angles and the roll angles of sample head suspensions as the calibration result is considered. The details are described below.

The correction recipe-table may be prepared in other portions, thereafter the results may be stored into the controller 11.

The controller 11 forms a correction recipe selecting section that selects an effectual correction recipe from the correction recipe-table to correct a head portion 19 so as to obtain target pitch angle and roll angle characteristic of the head portion of a flexure of an objective head suspension based on the measurement value. The effectual correction recipe instructs required portions of the objective flexure. At the time of the selection, the controller 11 adopts a factor to diminish an expected variation in pitch angle and roll angle characteristic due to correction. The details are described later.

The controller 11 forms a control section that controls the laser irradiation unit 9 to irradiate laser beams on irradiation lines of an objective flexure 17 to be corrected according to a selected correction recipe.

A correction recipe selecting unit and a control unit may be comprised respectively by other units.

As shown in FIG. 2, the laser irradiation unit 9 is configured so as to irradiate laser beams from above and from beneath on a head suspension 3 supported by the suspension set jig 15. The laser irradiation unit 9 may be configured to irradiate laser beams from any one of above or beneath. The suspension set jig 15 supports a set pin 21 which adjusts the height of a head portion 19 of a head suspension 3 supported by the suspension set jig 15 to a prescribed height with respect to the laser irradiation unit 9.

In the apparatus 1, the suspension set jig 15 supports an objective head suspension 3 on the carrier line 13 and moves toward the measuring unit 7 under the control of the controller 11. At the measuring unit 7, the suspension set jig 15 is positioned.

The measuring unit 7 measures a pitch angle and a roll angle in a head portion 19 of an objective flexure 17, and the measurement value of the measured pitch angle and roll angle is input to the controller 11.

The controller 11 selects an effectual correction recipe of irradiation lines to be a minimum expected variation of the head portion 19 of the objective flexure 17 due to correction from the stored correction recipe-table.

Then the suspension set jig 15 on the carrier line 13 moves toward the laser irradiation unit 9 under the control of the controller 11. At the laser irradiation unit 9, the objective head suspension 3 is positioned.

The controller 11 controls the laser irradiation unit 9 to irradiate laser beams on irradiation lines on the objective flexure 17 according to the selected correction recipe, to correct the pitch angle and the roll angle of the head portion 19.

After correction, the carrier line 13 is driven backward by the controller 11. Then the measuring unit 7 measures the pitch angle and the roll angle of the head portion 19 of the objective flexure 17 after the correction, and the head suspension 3 is taken out from the suspension set jig 15.

A method for correcting a static posture of a head portion according to the first embodiment of the present invention will be explained in comparison with a method for correcting a static posture with a minimum number of laser irradiation.

Figure 3:
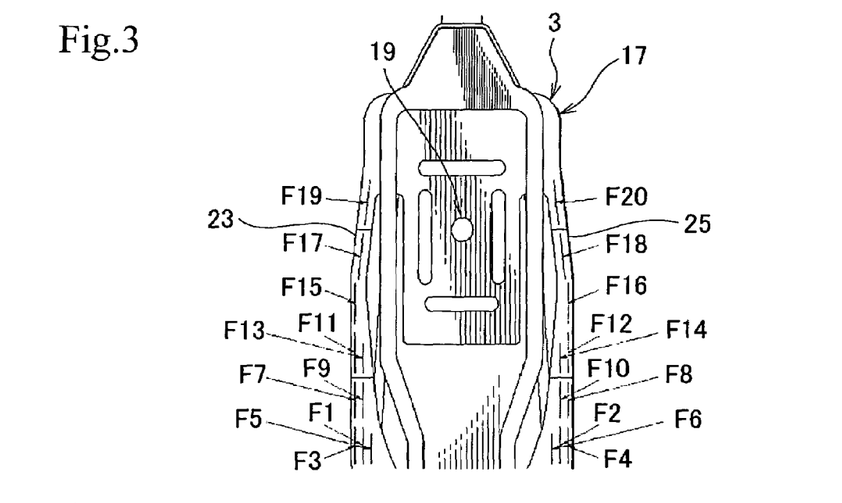
FIG. 3 is a plan view partly showing a flexure of a head suspension on which irradiation lines are expressed according to the first embodiment of the present invention.

FIG. 3 is a plan view partly showing a flexure 17 of a head suspension 3 on which irradiation lines are expressed.

According to the first embodiment of the present invention, the correction recipe-table is prepared for a single side face of a flexure 17, and the correction recipe is selected for a single side face of an objective flexure 17. In FIG. 3, irradiation lines are respectively set to outriggers 23 and 25 symmetric on a single side face that is a disk side face of a flexure 17. According to the first embodiment, the total number of irradiation lines is 20. Namely, one outrigger 23 has 10 irradiation lines that are referred to as odd numerals F1 to F19, and the other outrigger 25 has 10 irradiation lines that are referred to as even numerals F2 to F20. The irradiation lines may be set on besides the outrigger 23 and 25, or the irradiation lines may be set on a single opposite disk side face of a flexure. In the specification, the "disk side face" is a surface to face to the disk, and the "opposite disk side face" is oriented opposite to the disk. In other words, the opposite disk side face is opposite to the disk side face.

Figure 4A:
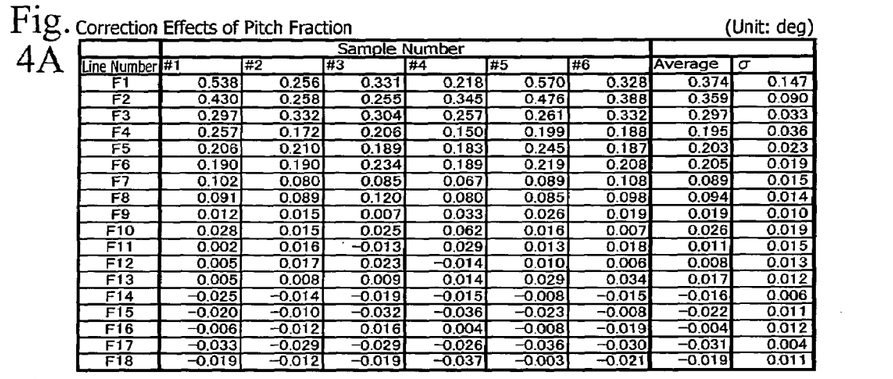
FIG. 4A is a list showing calibration results of a pitch fraction according to the first embodiment of the present invention.
Figure 4B:
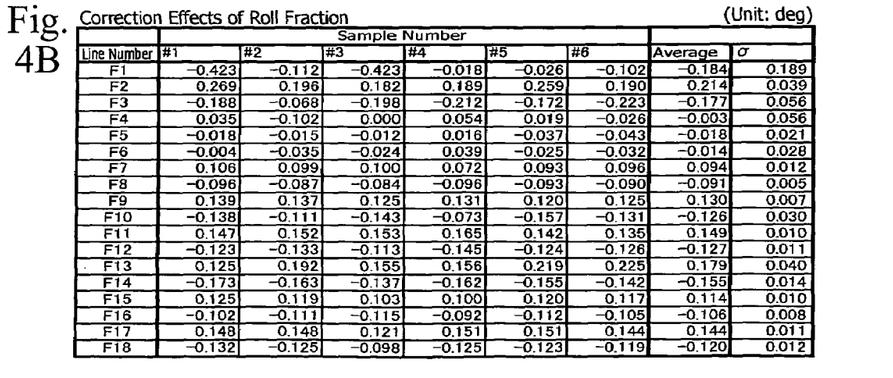
FIG. 4B is a list showing calibration results of a roll fraction according to the first embodiment of the present invention.

In the case of conducting calibration on irradiation lines F1 to F20 shown in FIG. 3, the calibration results are, for example, as shown in FIG. 4. The calibration results are obtained from 6 sample head suspensions #1 to #6. FIG. 4A is a list showing the calibration results of a pitch fraction and FIG. 4B is a list showing the calibration results of a roll fraction.

The lists of FIGS. 4A and 4B show, for example, that an average of a pitch angle changes is 0.374 deg and an average of a roll angle changes is −0.184 deg when irradiating a laser beam on the irradiation line F1 of each sample head suspension.

According the lists of FIGS. 4A and 4B, the correction recipe-table covering all the combinations of irradiation lines to correct a head portion 19 of an objective flexure 17 is prepared. Each combination instructs where and in what order to irradiate laser beams so as to obtain a target angle based on measurement value of a pitch angle and a roll angle before correction of a flexure 17 of an objective head suspension 3 to be corrected.

Figure 5A:
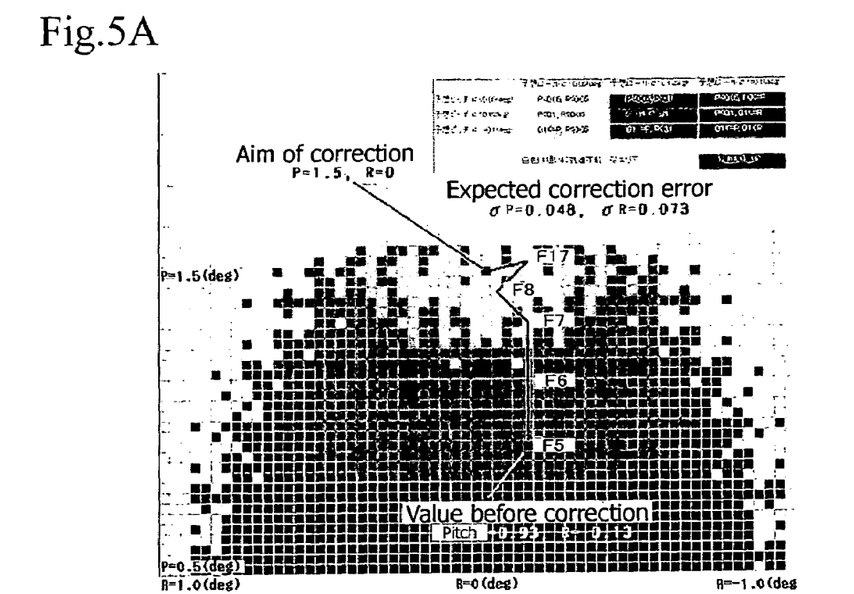
FIG. 5A is an image showing a correction recipe-table graphed dependently on variation in a pitch angle and a roll angle of each sample head suspension in the calibration according to the first embodiment of the present invention.
Figure 5B:
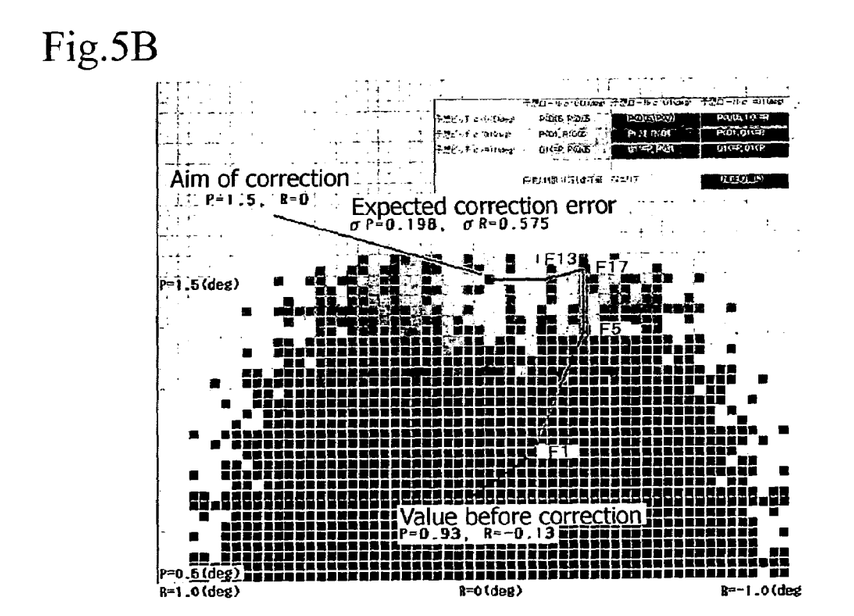
FIG. 5B is an image showing a correction recipe-table graphed dependently on a minimum number of laser irradiation according to a comparative example.

The correction recipe-table is graphed in FIG. 5. FIG. 5A is an image showing the correction recipe-table graphed dependently on variation in a pitch angle and a roll angle of each sample head suspension in the calibration according to the first embodiment of the present invention. FIG. 5B is an image showing a correction recipe-table graphed dependently on a minimum number of laser irradiation in the calibration according to a comparative example. In FIGS. 5A and 5B, an ordinate shows a pitch angle, and an abscissa shows a roll angle.

In FIGS. 5A and 5B, a level of each expected variation is indicated with the tone of color made by layering different tones of color respectively assigned to variations of both a pitch angle and a roll angle. According to the first embodiment, expected variations are classified in three levels of high-density blocks, mid-density blocks and low-density blocks. The low-density blocks each indicates an area of a minimum expected variation in a pitch angle and a roll angle due to correction. The high-density blocks each indicates an area of a great expected variation in a pitch angle and a roll angle due to correction.

First, the case of correction with the minimum number of laser irradiation out of view of variations will be explained.

In FIG. 5B, the correction recipe to correct with the minimum number of laser irradiation so as to obtain a target pitch angle of P=1.5 deg and a target roll angle of R=−0.13 deg is selected. In this way, one recipe is selected to correct a head portion with the minimum number of laser irradiation according to the calibration results. For example, by irradiating on the combination of irradiation lines F1, F5, F17 and F13, a pitch angle and a roll angle of a head portion 19 of a flexure 17 of an objective head suspension 3 to be corrected can be brought close to target values. Estimating a pitch angle and a roll angle based on the data on the calibration, an expected pitch angle is 0.93+0.374+0.203−0.031+0.017=1.493 deg, and an expected roll angle is −0.13−0.184−0.018+0.144+0.179=−0.009 deg after the correction.

In the comparative example of the correction method, correction can be made with the minimum number of laser irradiation, but variations among reference values of pitch angles and roll angles of sample head suspensions in the calibration. Therefore, an expected variation due to correction is great, to deteriorate the correction accuracy.

Examining the expected variation due to correction, if each expected line variations of irradiation lines due to correction are indicated as σ1, σ2, σ3, ..., each cumulative expected variation σT can be expressed as $\sigma T = \sqrt{\sigma 1^2 + \sigma 2^2 + \sigma 3^2 + \ldots}$. With the level of the cumulative expected variation in the case of the minimum number of laser irradiation, a block corresponding to a pitch angle and a roll angle before correction of FIG. 5B is indicated with the tone of color. Equally, the other correction recipes and expected variations can be also obtained, to indicate the other blocks with the tone of color as shown in FIG. 5B. Namely, all the blocks are toned in FIG. 5B. In addition, white blocks that are not colored or toned of FIG. 5B shows that there is no correction recipe to correct the head portion to obtain a target value.

On the other hand, a correction recipe in view of variations will be explained with reference to FIG. 5A.

In the correction recipe-table in view of variations shown in FIG. 5A, a number of low-density blocks increase, i.e., an area with minimum expected variation is expanded considerably in comparison with the correction recipe-table of FIG. 5B. Namely, in the correction recipe-table in view of variations, an area to be corrected accurately is expanded.

In FIG. 5A, a target pitch angle is P=1.5 deg and a target roll angle is R=0 deg, and a correction recipe with minimum variation due to correction is selected on the basis of a pitch angle of 0.93 deg and a roll angle of −0.13 deg before correction. The selected correction recipe, for example, is the combination of irradiation lines F5, F6, F7, F8 and F17. Estimating a pitch angle and a roll angle based on the data on the calibration on an equality with the comparative example, an expected pitch angle is 1.491 deg, and an expected roll angle is −0.015 deg after correction.

In the correction against the pitch angle of 0.93 deg and the roll angle of −0.13 deg before correction according to the correction recipe-table of FIG. 5A, an expected variation (correction error) due to the correction become a pitch fraction σ=0.036 deg and a roll fraction σ=0.039 deg.

In contrast, in the correction against a pitch angle of 0.93 deg and a roll angle of −0.13 deg before correction according to the correction recipe-table of FIG. 5B, an expected variation due to the correction become a pitch fraction σ=0.149 deg and a roll fraction σ=0.237 deg. Therefore, a head portion 19 corrected according to the correction recipe-table of FIG. 5B has great variation compared with a head portion 19 corrected according to the correction recipe-table of FIG. 5A.

According to the method for correcting a static posture of a head portion of the first embodiment of the present invention, it prepares the correction recipe-table of FIG. 5A in view of variations among sample head suspensions in the calibration. An effectual correction recipe is selected from the correction recipe-table of FIG. 5A so as to diminish an expected variation due to correction. According to the selected correction recipe, a head portion 19 of an objective flexure 17 is corrected. Therefore, it can correct the head portion 19 of the objective flexure 17 with high accuracy and can diminish correction error greatly compared with the correction with a minimum number of laser irradiation on the basis of the correction recipe-table of FIG. 5B.

Figure 6:
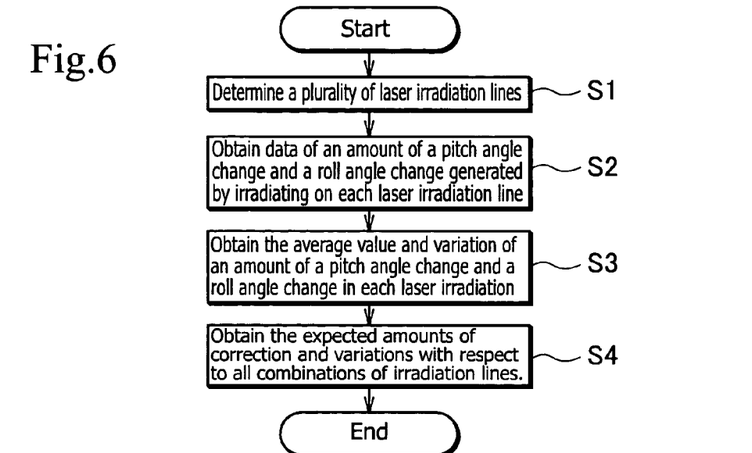
FIG. 6 is a flowchart of the calibration according to the first embodiment of the present invention.
Figure 7:
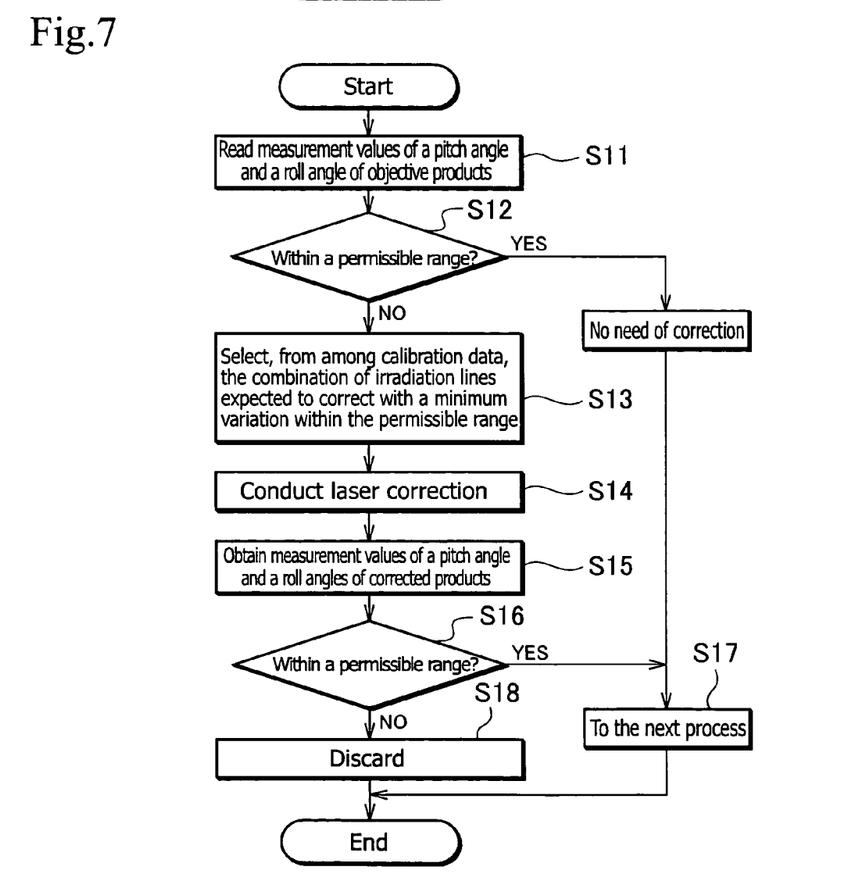
FIG. 7 is a flowchart of correction according to the first embodiment of the present invention.

Control flow in the static posture correcting apparatus 1 on the basis of the method for correcting a static posture will be explained with reference to FIGS. 6 and 7 in which FIG. 6 is a flowchart of calibration and FIG. 7 is a flowchart of correction. According to the first embodiment, the method for correcting a static posture is applied to the control by the controller 11 of FIG. 1.

First, calibration process according to the first embodiment will be explained in detail.

As shown in FIG. 6, when the calibration process is started, a plurality of laser irradiation lines is determined in step S1. For example, laser irradiation lines F1 to F20 of FIG. 3 as objective portions on which laser beams are irradiated are decided on, and the calibration process proceeds to step S2.

In step S2, it obtains data of an amount of a pitch angle change and a roll angle change generated by irradiating laser beam on each decided laser irradiation lines of each sample head suspension. Namely, the laser irradiation unit 9 of FIG. 1 irradiates laser beams on the decided irradiation line of each sample head suspension, and the measuring unit 7 of FIG. 1 measures a pitch angle and a roll angle of each sample head suspension due to the laser irradiation and input the measured angles to the controller 11 of FIG. 1. At the controller 11, measurement values as reference values of the input pitch angles and roll angles are read, and the each measurement value is operated to obtain the data of the amount of the pitch angle change and roll angle change. Thereafter, the calibration process proceeds to step S3.

In step S3, the operated amounts of the pitch angle changes and the roll angle changes in step S2 are further operated to obtain average value and variation in a pitch angle and a roll angle of each laser irradiation line. This process is carried out in the controller 11. Thereafter, the calibration process proceeds to step S4.

In step S4, the operated average values and variations in the pitch angle and the roll angle of each laser irradiation in step S3 are further operated to obtain expected amounts of correction and variation with respect to all combinations of irradiation lines F1 to F20, and the calibration process is terminated. This process is also carried out in the controller 11.

In this way, for example, the correction recipe-table in view of variations in a pitch angle and a roll angle as an image shown in FIG. 5A is prepared and is stored in the storing part of the controller 11 of FIG. 1.

Next, a correction process according to the first embodiment will be explained in detail.

As shown in FIG. 7, when the correction process is started, the controller 11 reads measurement values of a pitch angle and a roll angle of a head portion 19 of an objective flexure 17 before correction as an objective product in step S11. Namely, the measuring unit 7 measures the pitch angle and the roll angle of the head portion 19 and input measurement values of the measured pitch angle and roll angle to the controller 11. At the controller 11, the input measurement values are read. Thereafter, the correction process proceeds to step S12.

In step S12, the controller 11 determines whether the measurement values of the pitch angle and the roll angle of the head portion 19 are within a permissible range of set target values. Namely, the controller 11 compares the measurement values of the pitch angle and the roll angle with the set target values. If the measurement values are within the permissible range (Yes), the controller 11 decides the head portion 19 of the objective flexure 17 has no need to correct and sends the objective head suspension 3 to the next process. If the measurement values are not within the permissible range (NO), the correction process proceeds to step S13.

In step S13, the controller 11 selects a combination of irradiation lines expected to correct the head portion 19 with a minimum variation within the permissible range from the correction recipe-table of FIG. 5A as the calibration data. In this process, the combination of appropriate irradiation lines, for example, the F5, F6, F7, F8 and F17 are selected as an effectual correction recipe from the correction recipe-table. Thereafter, the correction process proceeds to step S14.

In step S14, laser beams are irradiated to correct the head portion 19 of the objective flexure 17. In this process, the objective head suspension 3 together with the suspension set jig 15 of FIG. 1 is moved to and positioned at the laser irradiation unit 9 with the control of the controller 11. The laser irradiation unit 9 is controlled to irradiate laser beams on the irradiation lines F5, F6, F7, F8 and F17 according to the selected correction recipe. Thereafter, the correction process proceeds to step S15.

In step S15, a pitch angle and a roll angle of the head portion 19 of the objective flexure 17 as a corrected product is measured. Namely, the objective head suspension 3 together with the suspension set jig 15 is moved to the measuring unit 7 from the laser irradiation unit 9 after the correction, and is positioned at the measuring unit 7. The measuring unit 7 measures the pitch angle and the roll angle of the head portion 19 of the objective flexure 17 after the correction and inputs the measured values (measurement values) to the controller 11. The controller 11 reads the input measurement values, and the correction process proceeds to step S16.

In step S16, the controller 11 determines whether the measurement values of the pitch angle and the roll angle of the head portion 19 after the correction are within the permissible range of the set target values. This step is the same as step S12. Namely, the controller 11 compares the measurement values of the pitch angle and the roll angle with the set target values. If the measurement values are within the permissible range (Yes), the correction process proceeds to step S17. If the measurement values are not within the permissible range (No), the correction process proceeds to step S118.

In step S17, it proceeds to next processes. Namely, the corrected head suspension 3 is taken out form the suspension set jig 15 and transferred to the next process.

In step S18, the head suspension 3 is discarded. Namely, the uncorrected head suspension 3 is taken out form the suspension set jig 15 and transferred to a discard unit.

According to the first embodiment of the present invention, the method for correcting a static posture of a head portion and the static posture correcting apparatus 1 prepares the correction recipe-table in view of variations in a pitch angle and a roll angle of each sample head suspension due to laser irradiation on in the calibration. A correction recipe is selected to correct a head portion 19 of an objective flexure 17 to obtain target pitch angle and roll angle characteristic so as to diminish an expected variation in a pitch angle and a roll angle due to the correction. Therefore, it can suppress the variation in the pitch angle and the roll angle due to the correction and can correct the head portion 19 with high accuracy.

The controller 11 prepares the correction recipe-table with respect to a single side face of a flexure 17 of a head suspension 3, and selects the correction recipe with respect to only the single side face of a flexure 17 of an objective head suspension 3 to be corrected. Therefore, it can prevent the amount of data operation from increasing, and thereby, it is possible to process quickly and miniaturize apparatus.

Figure 8A:
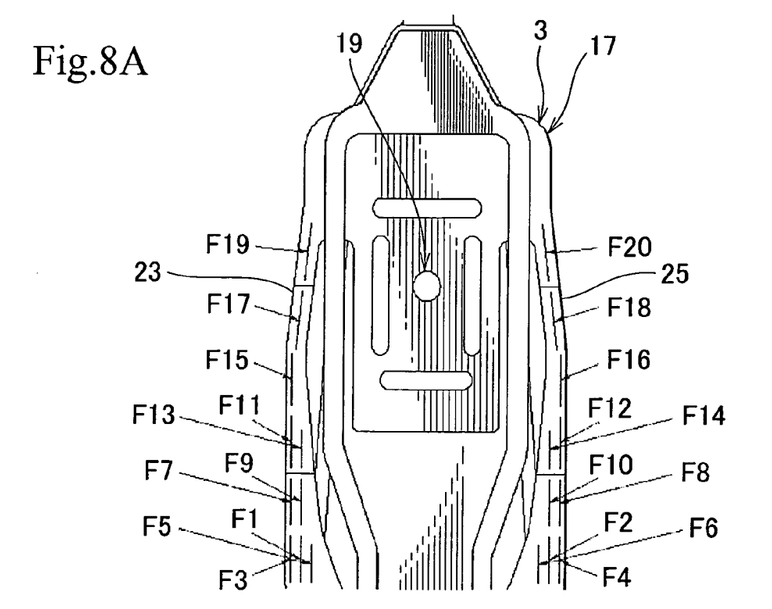
FIG. 8A is a plan view partly showing a disk side face of a flexure of a head suspension on which irradiation lines are expressed according to a second embodiment of the present invention.
Figure 8B:
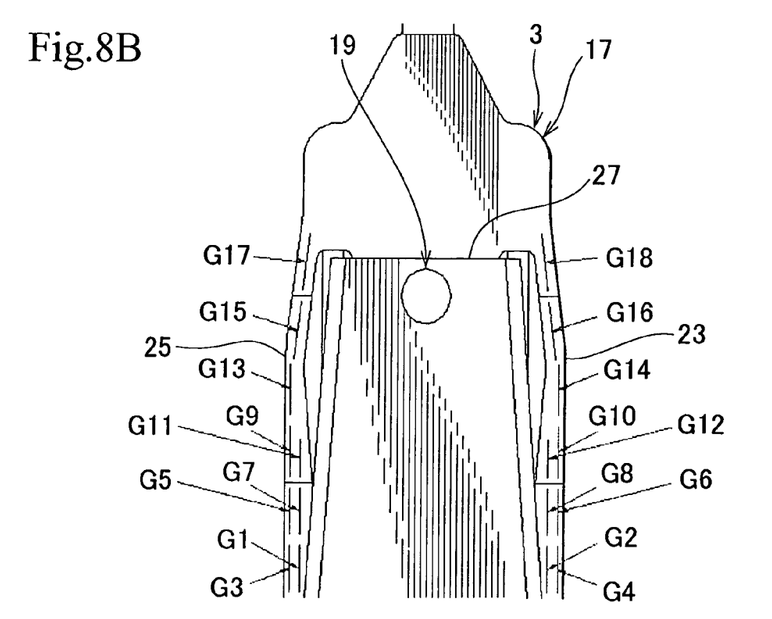
FIG. 8B is a plan view partly showing a opposite disk side face of a flexure of a head suspension on which irradiation lines are expressed according to the second embodiment of the present invention.

A second embodiment of the present invention will be explained with reference to FIGS. 8 and 9. FIG. 8A is a plan view partly showing a disk side face of a flexure of a head suspension on which irradiation lines are expressed and FIG.

8B is a plan view partly showing a opposite disk side face of the flexure on which irradiation lines are expressed.

In the second embodiment, although FIGS. 1 and 2 are also referred to, control of a controller 11 of the second embodiment is different from the control of the controller 11 of the first embodiment. Namely, the controller 11 of the second embodiment prepares a correction recipe-table with respect to both side faces of a flexure 17, and selects a correction recipe with respect to both side faces of a flexure 17 of an objective head suspension 3.

As shown in FIG. 8A, the irradiation lines is the same as FIG. 3 serving as objective portions to be corrected are set in a disk side face of a flexure 17 of a head suspension 3. In addition, as shown in FIG. 8B, irradiation lines are also set on an opposite disk side face of the flexure 17. On the opposite disk side face, a load beam 27 is arranged, and thereby, spaces for setting irradiation lines becomes slightly smaller than FIG. 3. Therefore, a total number of the irradiation lines on the opposite disk side face is 18. One outrigger 23 has 9 irradiation lines referred to as even numerals G2 to G18 and the other outrigger 25 has 9 irradiation lines referred to as odd numerals G1 to G17 on the opposite disk side face. The irradiation lines on the opposite disk side face are set in the obversely and reversely same position with respect to corresponding irradiation lines on the disk side face. It may select irradiation lines not in the obversely and reversely same position.

Figure 9A:
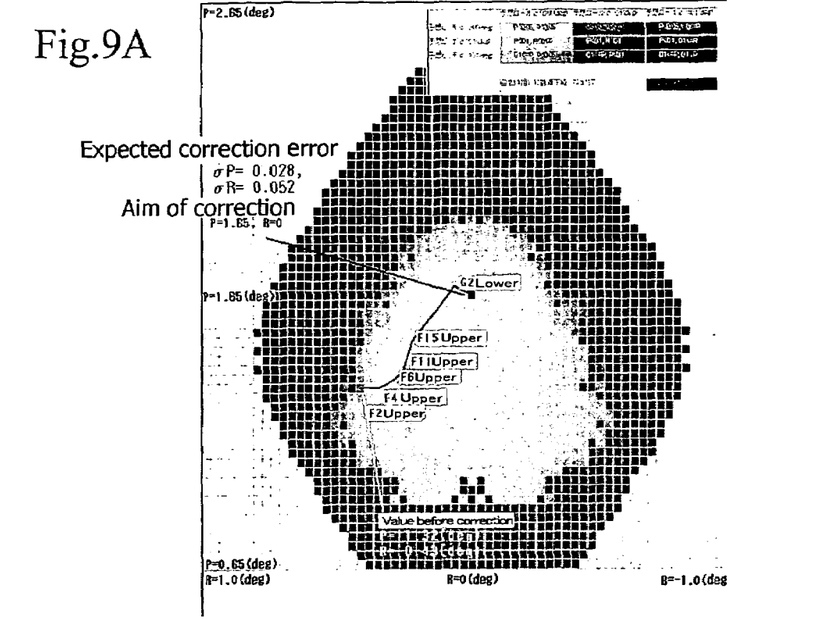
FIG. 9A is an image showing a correction recipe-table graphed dependently on variation in a pitch angle and a roll angle of each sample head suspension in calibration according to the second embodiment of the present invention.
Figure 9B:
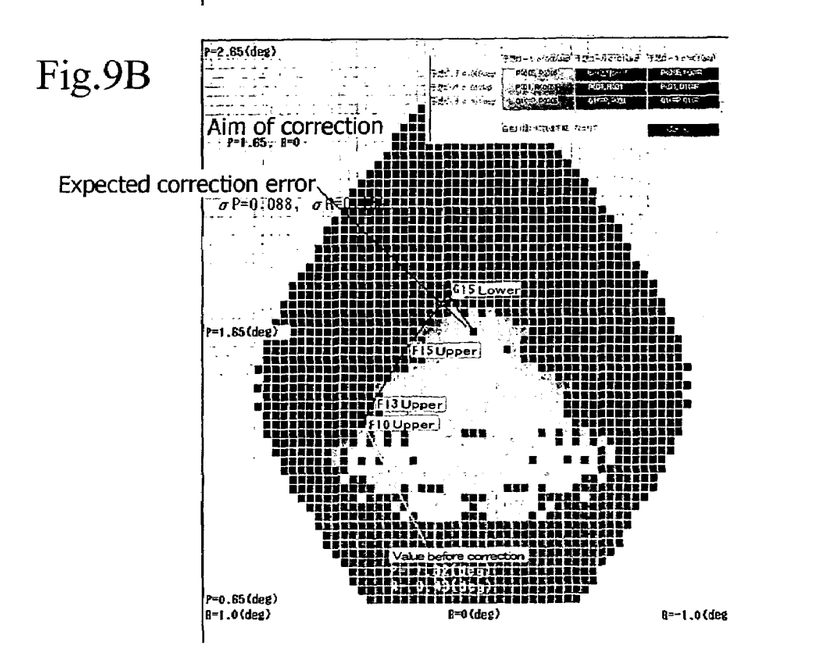
FIG. 9B is an image showing a correction recipe-table graphed dependently on a minimum number of laser irradiation according to a comparative example.

FIG. 9A is an image showing a correction recipe-table graphed dependently on variations in a pitch angle and a roll angle of each sample head suspension in the calibration, and FIG. 9B is an image showing a correction recipe-table graphed dependently on a minimum number of laser irradiation. In FIGS. 9A and 9B, an ordinate shows a pitch angle and an abscissa shows a roll angle.

In a correction recipe-table of FIG. 9A in view of variations in a pitch angle and a roll angle according to the second embodiment of the present invention, a number of low-density blocks increases, i.e., an area with minimum expected variation is expanded considerably in comparison with the correction recipe-table of FIG. 9B. Namely, in the correction recipe-table in view of variations, an area to be corrected accurately is expanded.

Both in the correction recipe-table of FIGS. 9A and 9B, the disk side face is referred to as "Upper" and the opposite disk side face is referred to as "Lower." The correction recipe-table is prepared with respect to both side faces of a flexure 17, and a correction recipe is selected with respect to the both side faces of a flexure 17 of an objective head suspension 3.

Then in the correction recipe-table of FIG. 9B, the selected correction recipe is, for example, a combination of upper irradiation lines F10, F13, F15 and a lower irradiation line G15. In correction against a pitch angle of 1.32 deg and a roll angle −0.43 deg before correction, an expected variation includes a pitch fraction of σ=0.088 deg and a roll fraction of σ=0.199 deg. Accordingly, the expected variation is great, to generate great correction error.

On the other hand, in the correction recipe-table of FIG. 9A, the selected correction recipe is, for example, a combination of upper irradiation lines F2, F4, F6, F11, F15 and a lower irradiation line G2. In correction against a pitch angle of 1.32 deg and a roll angle of −0.43 deg before correction, expected variation includes a pitch fraction of σ=0.028 deg and a roll fraction of σ=0.052 deg. Therefore, correction error based on the expected variation due to correction can be suppressed.

Accordingly, the second embodiment of the present invention realizes substantially the same effect as those of the first embodiment. In addition, the correction recipe-table is prepared with respect to both side faces of a flexure 17, and a correction recipe is selected with respect to both side faces of a flexure 17 of an objective head suspension 3, so that it can conduct correction of a head portion 19 of the objective flexure 17 with higher accuracy.

What is claimed is:

1. A method for correcting a static posture of a head portion, the head portion constituting a flexure to be attached to a head suspension for supporting a slider, the method comprising steps of:

preparing a correction recipe-table based on reference values of static posture angle changes obtained from head portions of flexures of a plurality of sample head suspensions by irradiating laser beams on a plurality of objective portions of each head portion;

measuring a static posture angle of a head portion of a flexure of an objective head suspension to be corrected;

selecting an effectual correction recipe instructing required portions of the flexure of the objective head suspension on which laser beams are irradiated from the correction recipe-table based on measurement value of the measured static posture angle; and irradiating laser beams on the required portions of the flexure of the objective head suspension according to the selected correction recipe so as to correct the static posture angle of the head portion of the flexure of the objective head suspension, wherein the correction recipe-table is prepared in view of variations among the reference values of the static posture angle changes of the sample head suspensions, and the correction recipe is selected in such that an expected variation due to correction is diminished to obtain target static posture angle characteristic of the head portion of the flexure of the objective head suspension.

2. The method of correcting a static posture of a head portion of claim 1, wherein the correction recipe-table is prepared with respect to a single side face of the flexure of the head suspension, and the correction recipe is selected with respect to the single side face of the flexure of the objective head suspension.

3. The method of correcting a static posture of a head portion of claim 1, wherein the correction recipe-table is prepared with respect to both side faces of the flexure of the head suspension to be corrected, and the correction recipe is selected with respect to the both side faces of the flexure of the objective head suspension.

4. A static posture correcting apparatus comprising:

a correction recipe-table preparing section preparing a correction recipe-table based on reference values of static posture angle changes of head portions obtained from a plurality of sample head suspensions by irradiating laser beams on a plurality of objective portions of a flexure of each sample head suspension;

a static posture measuring section for measuring a static posture angle of a head portion of a flexure of a head suspension;

a laser irradiating section configured so as to irradiate laser beams on required portions to be corrected of a flexure of an objective head suspension;

a correction recipe selecting section selecting an effectual correction recipe instructing the required portions of the flexure of the objective head suspension from the correction recipe-table based on measurement value of a measured static posture angle by the static posture measuring section; and a controlling section controlling the laser irradiating section to irradiate laser beams on the required portions of the flexure of the objective head suspension according to the selected correction recipe so as to obtain a target static posture angle of the head portion of the flexure of the objective head suspension; wherein the correction recipe-table preparing section considers variations among the reference values of the static posture angle changes of the sample head suspensions when preparing the correction recipe-table, and the correction recipe selecting section selects the recipe so as to diminish an expected variation in target static posture angle characteristic due to correction.

5. The static posture correcting apparatus of claim 4, wherein the correction recipe-table preparing section prepares the correction recipe-table with respect to a single side face of the flexure of the head suspension, and the recipe selecting section selects the correction recipe with respect to the single side face.

6. The static posture correcting apparatus of claim 4, wherein the correction recipe-table preparing section prepares the correction recipe-table with respect to both side faces of the flexure of the head suspension, and the recipe selecting section selects the correction recipe with respect to the both side faces.

* * * * *